United States Patent [19]

Minoda

[11] Patent Number: 5,731,770
[45] Date of Patent: Mar. 24, 1998

[54] DIGITAL DATA BUFFERING DEVICE

[75] Inventor: Hidenori Minoda, Higashihiroshima, Japan

[73] Assignee: Sharp Kabushiki Kaisha, Osaka, Japan

[21] Appl. No.: 602,419

[22] Filed: Feb. 16, 1996

[30] Foreign Application Priority Data

Apr. 12, 1995 [JP] Japan ........................... 7-87190

[51] Int. Cl.$^6$ ........................... H03M 7/00
[52] U.S. Cl. ........................... 341/61; 327/113
[58] Field of Search ........................ 341/50, 60; 375/354, 375/355; 364/724.1; 327/113, 114

[56] References Cited

U.S. PATENT DOCUMENTS

| | | | |
|---|---|---|---|
| 4,020,332 | 4/1977 | Crochiere | 341/61 |
| 5,101,369 | 3/1992 | Torii et al. | 364/724.11 |
| 5,446,398 | 8/1995 | Iwata | 327/113 |
| 5,457,456 | 10/1995 | Norsworthy | 341/61 |
| 5,513,209 | 4/1996 | Holm | 375/354 |
| 5,519,395 | 5/1996 | Buchler et al. | 341/61 |

FOREIGN PATENT DOCUMENTS

| | | |
|---|---|---|
| 53307 | 2/1992 | Japan . |
| 327409 | 12/1993 | Japan . |

Primary Examiner—Marc S. Hoff
Attorney, Agent, or Firm—Nixon & Vanderhye, P.C.

[57] ABSTRACT

When digital audio data is input, the data is temporarily stored in a ring buffer memory. A clock generator adjusts an output transfer clock cycle so that the difference between the count of an address counter for writing data and the count of an address counter for reading data always falls within a predetermined range. An input rate calculating circuit calculates an average transfer rate at which the input data is transferred. The clock generator increases or decreases the transfer rate of the output data so that the average transfer rate of the output data becomes equal to the average transfer rate of the input data. Consequently, a fluctuation of the transfer rate of the output data is prevented, and thus deterioration of the quality of output signals of digital data is prevented. Moreover, reproduction of output signals becomes available with the use of a synchronous sampling rate converter.

14 Claims, 10 Drawing Sheets

DIGITAL DATA BUFFERING DEVICE

FIELD OF THE INVENTION

The present invention relates to a digital data buffering device. For example, the digital data buffering device is used in digital audio equipment having an interface for digital data.

BACKGROUND OF THE INVENTION

A DAT (digital audio tape) recorder and an MD (mini disk) recorder have a digital audio interface. Such equipment is capable of recording audio signals in digital form. In the equipment, signals input to the digital audio interface are monitored through a D/A (digital-to-analog) converter.

The above-mentioned equipment includes a PLL (phase-locked loop) circuit. The PLL circuit generates a PLL clock for reading digital interface data. The PLL circuit divides the PLL clock, and generates a data transfer clock that is used for transferring data to the D/A converter.

It is possible to provide the PLL circuit with an asynchronous sampling rate converter. For example, Japanese Publication for Unexamined Patent Application (Tokukaihei) No. 4-53307/1992 and No. 5-327409/1993 disclose asynchronous sampling rate converters. In this case, the asynchronous sampling rate converter transfers data to the D/A converter at a transfer rate (transfer speed) which is obtained by dividing an internal clock. However, since the asynchronous sampling rate converter calculates data by a linear approximation, it is difficult to obtain highly accurate output data. On the other hand, the PLL circuit may be provided with a synchronous sampling rate converter. In this case, an output of the synchronous sampling rate converter is extremely accurate.

However, when monitoring an input signal to a digital data interface such as a digital audio interface through the D/A converter as mentioned above, the transfer rate of digital data to the D/A converter fluctuates for various reasons, for example, jitter of the clock.

For instance, if the PLL circuit is formed by a digital circuit, a PLL clock fluctuates at intervals of one cycle of an internal clock used as a master clock or at intervals of one half of the internal clock cycle. Consequently, the data transfer clock and in turn the transfer rate of the digital data fluctuate. Thus, the quality of output signals of the digital data monitored deteriorates. For example, in audio equipment, the sound quality of monitored sound deteriorates (distortion and noise occur).

Moreover, for example, when the PLL circuit is provided with the synchronous sampling rate converter, output data of the synchronous sampling rate converter is generated at the time a sampling rate converting operation is completed. In this case, it is difficult to transfer the converted data to the D/A converter at a uniform transfer rate. Thus, reproduction of an output signal becomes difficult.

Considering such difficulties, application of a buffering device to the synchronous sampling rate converter is contemplated so as to output input data at a uniform transfer rate after temporary storage of the input data. However, in a conventional buffering device, since the transfer rate of the output data is only made uniform, a buffer may be saturated with data or the buffer may become empty due to a change in the input rate. As a result, the quality of output signals of the digital data deteriorates. For instance, in audio equipment, interruption of monitored sound occurs. Furthermore, in a conventional buffering device, the data transfer clock and in turn the transfer rate of the digital data fluctuate because of inconsistency of the average input rate and the output rate. Consequently, the quality of output signals of the digital data deteriorates.

SUMMARY OF THE INVENTION

It is an objective of the present invention to provide a digital data buffering device capable of preventing deterioration of the quality of output signals of digital data by adjusting the transfer rate of output data according to a change in the transfer rate of input data.

In order to achieve the above objective, a digital data buffering device of the present invention includes:
  a memory section for storing input data; and
  a controlling section for controlling the transfer rate of output data to be transferred from the memory section,
    wherein the controlling section controls the transfer rate of the output data so that the number of data stored in the memory section is always within a predetermined range.

With this configuration, input data is temporarily stored in the memory section. At this time, the transfer rate of the input data always varies. Therefore, the controlling section controls the transfer rate of output data to be transferred from the memory section so that the number of data stored in the memory section always falls within a predetermined range.

For example, when the input rate is fast, input data is successively input into the memory section. At this time, data is output at an increased output rate under the control of the controlling section so as to prevent the number of data stored in the memory section from exceeding the predetermined number. Namely, even when data is successively input, data is successively output by increasing the output rate. Consequently, the memory section can never be saturated with input data exceeding the predetermined amount.

On the other hand, when the input rate is slow, the controlling section controls the output rate to be decreased so as to prevent the number of data stored in the memory section from becoming lower than the predetermined number. This control prevents the memory section from being emptied because of the output of data.

As described above, even if the cycle of the transfer clock of input data deviates from a predetermined reference value and the transfer rate of the input data fluctuates, the memory section can never be saturated with excess data or be emptied because the controlling section controls the transfer rate of the output data to be transferred from the memory section so that the number of the data stored in the memory section falls within the predetermined range. Therefore, when monitoring input signals of a digital data interface through a D/A converter, it is possible to prevent a fluctuation of the transfer rate of digital data to be transferred to the D/A converter. Consequently, deterioration of the quality of output signals of the digital data can be prevented. Moreover, if a synchronous sampling rate converter is used, reproduction of the output signals becomes available.

The digital data buffering device of the present invention preferably includes an average rate calculating section for calculating an average input rate in a predetermined period, and the controlling section preferably controls the transfer rate of the output data based on an output from the average rate calculating section. In this preferable configuration, the following function and effects are obtained.

By calculating the average input rate in a predetermined period with the average rate calculating section, the difference between the average input rate and a predetermined reference value is found. The difference is input to the controlling section. The controlling section calculates a speed correction amount based on the input difference, and makes a fine adjustment to the reference clock of output data according to the speed correction amount. As a result, the average output rate and the average input rate calculated by the average rate calculating section become equal to each other. Such a fine adjustment of the output rate prevents a fluctuation of a D/A converter master clock.

For a fuller understanding of the nature and advantages of the invention, reference should be made to the ensuing detailed description taken in conjunction with the accompanying drawings.

DESCRIPTION OF THE PREFERRED EMBODIMENTS

The following description will discuss one embodiment of the present invention with reference to FIGS. 1 to 11. In this embodiment, a digital data buffering device of the present invention is applied to a synchronous sampling rate converter.

Figure 1:
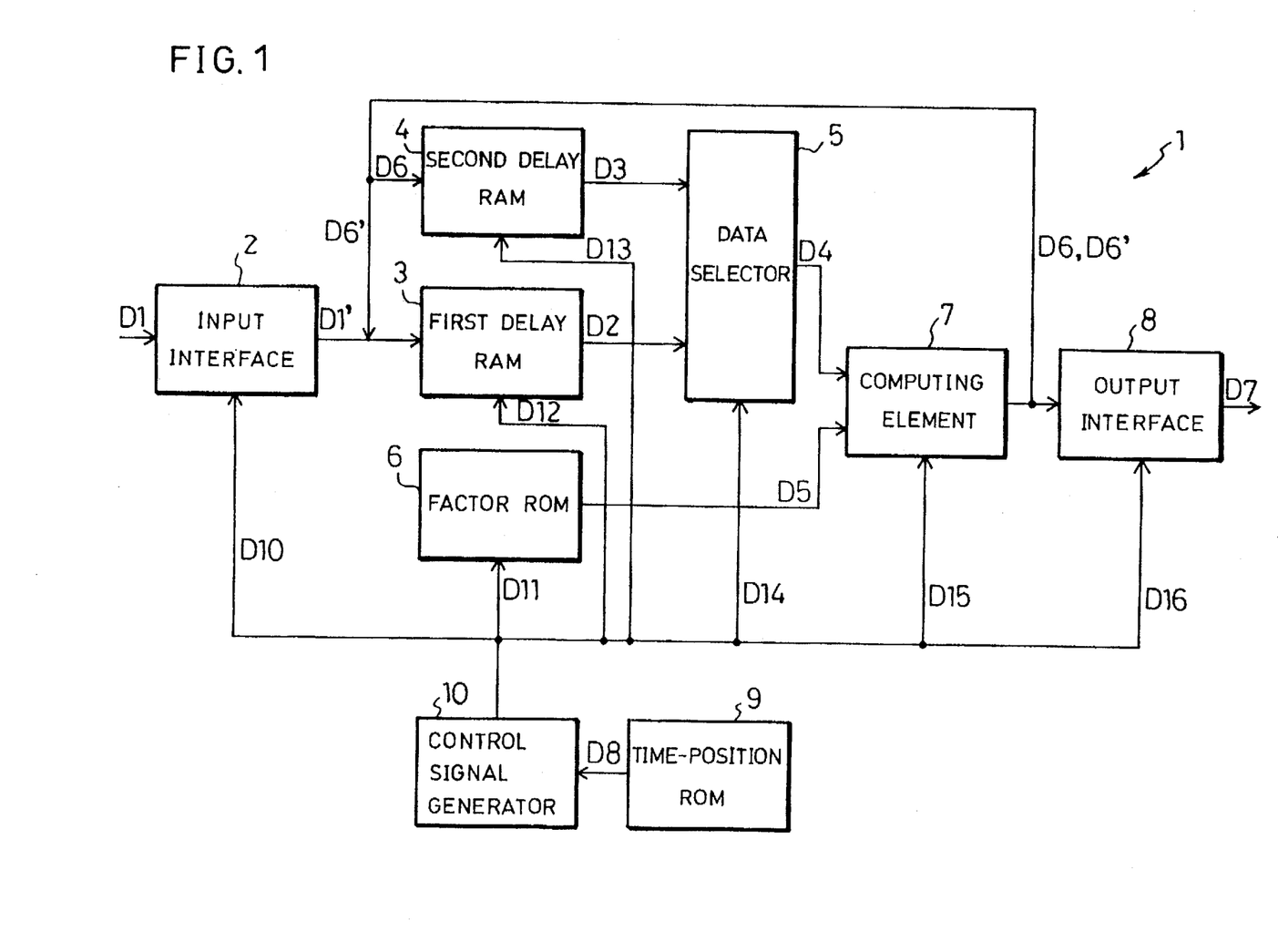
FIG. 1 is a block diagram showing a schematic circuit structure of a sampling rate converter to which a digital data buffering device according to one embodiment of the present invention is applied.

As illustrated in FIG. 1, in a sampling rate converter 1, an input interface 2 is connected to a first delay RAM (random access memory) 3. The first delay RAM 3 and a second delay RAM 4 are connected to a data selector 5. The data selector 5 and a factor ROM (read only memory) 6 are connected to a computing element 7. The computing element 7 is connected to an output interface 8.

A control signal generator 10 to which a time-position ROM 9 is connected, is connected to all of the above-mentioned elements. Namely, the control signal generator 10 is connected to the input interface 2, the first delay RAM 3, the second delay RAM 4, the data selector 5, the factor ROM 6, the computing element 7, and the output interface 8. The time-position ROM 9 stores the number of times the operation is performed and the operation time position. The number of times the operation is performed is the number of times a polyphase filter performs its operation in one input data cycle. The operation time position indicates a time at which the operation is to be performed.

More specifically, in the sampling rate converter 1, an FIR filter (non-cyclic digital filter) and a polyphase filter as digital filters are formed by the input interface 2, the first delay RAM 3, the second delay RAM 4, the data selector 5, the factor ROM 6, the computing element 7, the output interface 8, the time position ROM 9, and the control signal generator 10.

In FIG. 1, D1 and D1' represent input data, and D2 and D3 are delayed data. D4 indicates selected delayed data. D5 is factor data. D6 and D6' are data representing the result of an operation. D7 represents output data. D8 is data indicating a point at which the time position of the output data coincides with an over-sampling result of the input data. D10 to D16 are control signals in respective blocks.

Next, the rate converting (sampling frequency converting) principle of this embodiment will be discussed. In this embodiment, the sampling frequency "f1" of the input data is set at 48 kHz and 32 kHz, and the sampling frequency "f2" of the output data is set at 44.1 kHz.

100 (Hz) is used as a predetermined value "k", and each of the above sampling frequencies is divided by this value. As a result, integers, 480 and 320, are obtained on the input side, and an integer, 441, is given on the output side.

In this embodiment, 441 times over-sampling corresponding to the integer on the output side is applied to the input data irrespectively of the sampling frequency of the input data.

441 can be represented by the product of integers, 3.3.49. Therefore, in this embodiment, first, a three times over-sampling operation is performed twice. Finally, 49 that is the maximum value between the integers (3 and 49) is used, and a 49 times over-sampling operation is performed.

The 49 times over-sampling operation is performed using the polyphase filter only at a point where the time position of the output data and the over-sampling result of the input data coincide with each other. Thereafter, 480 data or 320 data corresponding to the numeric values on the input side are output as the result of over-sampling.

Consequently, data with a sampling frequency (in this case, 44.1 kHz) after conversion is obtained. Namely, there is no need to perform interpolation. As a result, a signal level error does not become larger, thereby producing highly accurate output data.

When "k" is set to 10, or the power of 10, for example, $10^2$, even if f1 takes various values such as 48 kHz and 32 kHz, f1/k and f2/k become integers. Namely, "k" does not vary depending on the sampling frequency f1 before the rate conversion. Therefore, it is not necessary to change the multiple of over-sampling depending on the sampling frequency f1 before the rate conversion. As a result, the computing type and the number of times the operation is performed can be unified. It is thus possible to simplify the circuit structure of the sampling rate converter.

Moreover, as described above, the FIR filter and the polyphase filter are combined and the operation of over-sampling in the polyphase filter is performed only at a point where the time position of output coincides with the over-sampling result of the input data. Consequently, the number of times the operation is performed can be reduced. It is thus possible to further simplify the circuit structure.

Figure 2:
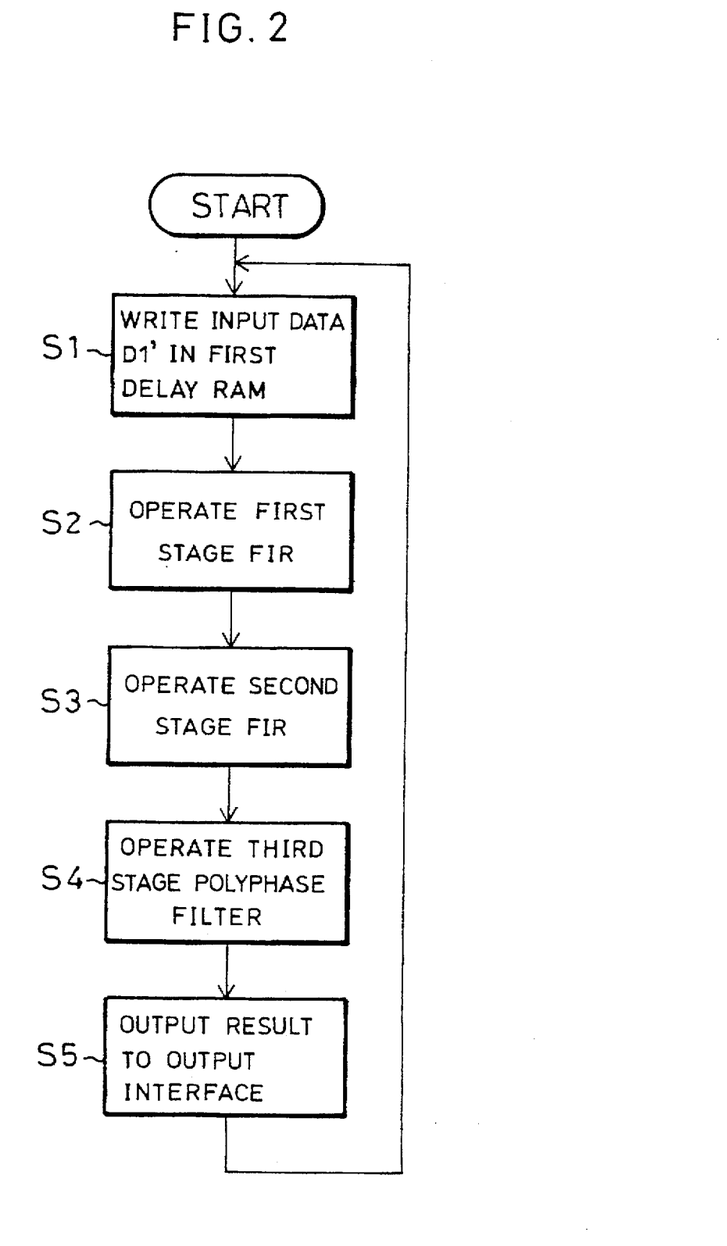
FIG. 2 is a flow chart showing a rate converting operation of the sampling rate converter of FIG. 1.

Referring now to FIG. 2, the following description will discuss the rate converting operation in the circuit of the sampling rate converter.

First, input data D1' is written in the first delay RAM 3 (S1, an abbreviation for "step 1"). Next, the operation of the FIR in the first stage is performed, and data D6 representing the result of the operation is written in the second delay RAM 4 (S2).

Subsequently, the operation of the FIR in the second stage is performed (S3), and data D6' representing the result of the operation is written in the first delay RAM 3.

Finally, data D8 of the time-position ROM 9 is referred, and the operation of the polyphase filter is performed (S4) only at a position where the time position of the output data coincides with the over-sampling results of the input data (for example, D1 and D1'). The result of the operation of the polyphase filter is output to the output interface 8 (S5). The above-mentioned operations are repeated in the sampling cycles of the input data.

FIGS. 3(a), 3(b), 4(a) and 4(b) show the relation between the over-sampling and the output data after the rate conversion.

Figures 3A, 3B:
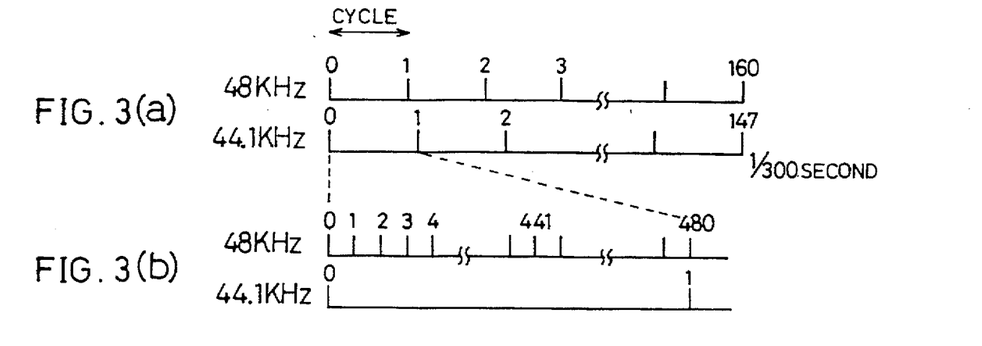
FIGS. 3(a) and 3(b) are explanatory views showing an over-sampling operation performed by the sampling rate converter of FIG. 1.

As illustrated in FIG. 3(a), when the sampling frequency of the input data is 48 kHz and the sampling frequency of the output data is 44.1 kHz, it takes the same (1/300 seconds) for performing sampling 160 times and for performing sampling 147 times. As shown in FIG. 3(b), in the over-sampling operation, sampling is performed 441 times in one sampling period (cycle) at 48 kHz. The resulting data is fetched every 480 pieces of data.

Figures 4A, 4B:
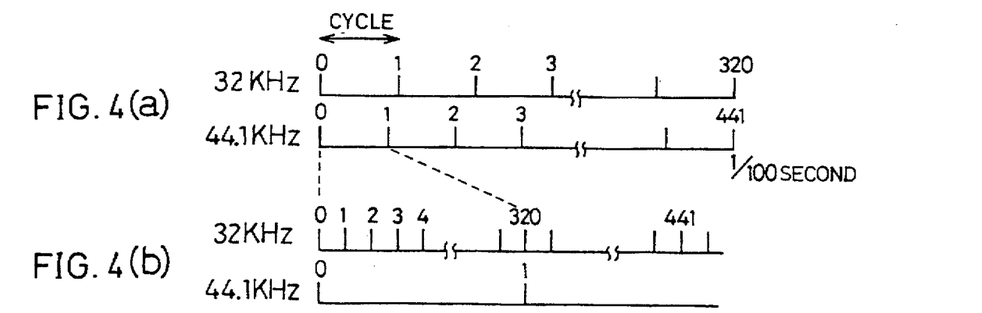
FIGS. 4(a) and 4(b) are explanatory views showing an over-sampling operation performed by the sampling rate converter of FIG. 1.

As illustrated in FIG. 4(a), when the sampling frequency of the input data is 32 kHz and the sampling frequency of the output data is 44.1 kHz, it takes the same time (1/100 seconds) for performing sampling 320 times and for performing sampling 441 times. As shown in FIG. 4(b), in the over-sampling operation, sampling is performed 441 times in one sampling period (cycle) at 32 kHz. The resulting data is fetched every 320 pieces of data.

Figure 5:
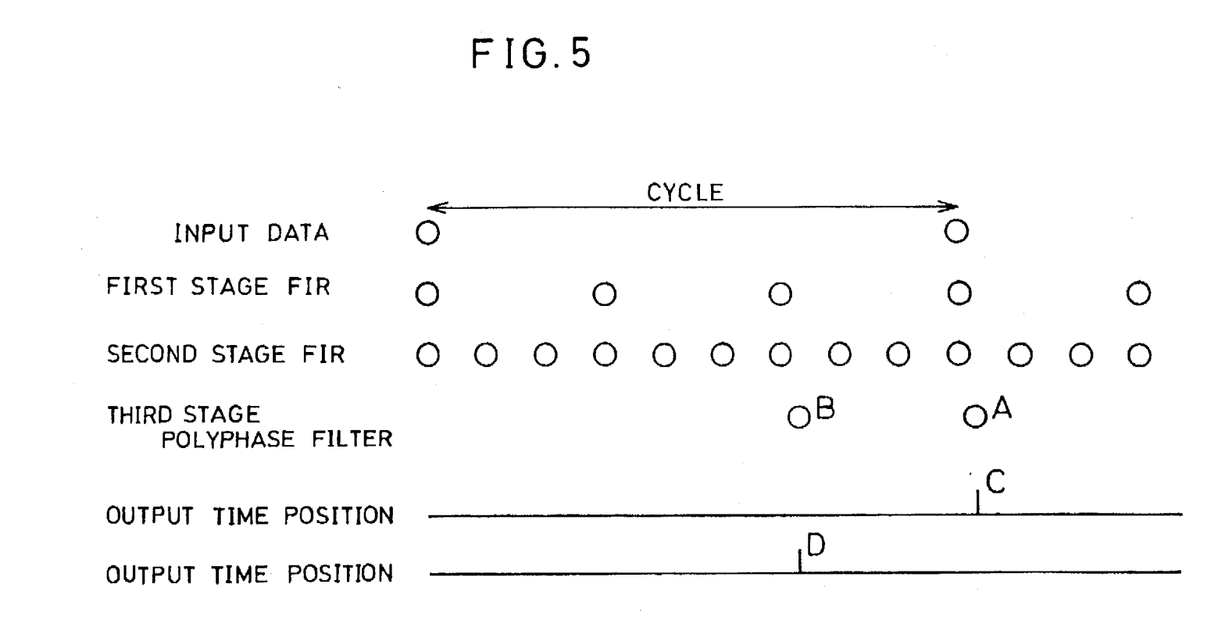
FIG. 5 is an explanatory view showing an over-sampling operation performed by the sampling rate converter of FIG. 1.

In addition, as illustrated in FIG. 5, the operation of the FIR in the first stage and the operation of the FIR in the second stage are performed within the sampling cycle of the input data. The operation of the polyphase filter in the third stage is carried out only when the time position of the output data coincides with the time position of the 441 times over-sampling. Namely, the rate conversion from 48 kHz to 44.1 kHz is performed only at a position "A" in FIG. 5 (i.e., position "C" on an output time-position axis). The rate conversion from 32 kHz to 44.1 kHz is executed only at a position "B" in FIG. 5 (i.e., position "D" on the output time-position axis).

In this case, as is clear from FIGS. 3(a) and 3(b), when converting the sampling rate from 48 kHz to 44.1 kHz, the number of times that the operation of the polyphase filter in the third stage is performed within one cycle of the input data is zero or once depending on each case. Moreover, as is clear from FIGS. 4(a) and 4(b), when converting the sampling rate from 32 kHz to 44.1 kHz, the number of times that the operation of the polyphase filter in the third stage is performed within one cycle of the input data is once or twice depending on each case. As described above, the number of times the operation is performed and the operation time position indicating the time at which the operation is to be performed ("C" and "D" on the output time-position axis shown in FIG. 5) are stored in the time-position ROM 9.

Thus, since the operation time position that is the time at which the time position of output in the operation of the polyphase filter in the third stage coincides with the time position of over-sampling is stored in the time-position ROM 9, the contents of control of the operations and fetching data can be simplified. It is therefore possible to further simplify the circuit structure.

In this embodiment, the sampling rate is converted from 48 kHz to 44.1 kHz and from 32 kHz to 44.1 kHz, respectively. However, the numeric values may be freely changed.

Additionally, the multiple of over-sampling and the number of stages of filters such as the FIR filter are not necessarily limited to those mentioned above. It is only necessary to over-sampling using a polyphase filter in the final stage and perform the operation only at a point where the time position of the output data coincides with the result of the over-sampling of the input data so that the number of times the operation is performed during over-sampling in the final stage becomes minimum.

The following description will discuss the structure of the digital data buffering device according to this embodiment.

Figure 6:
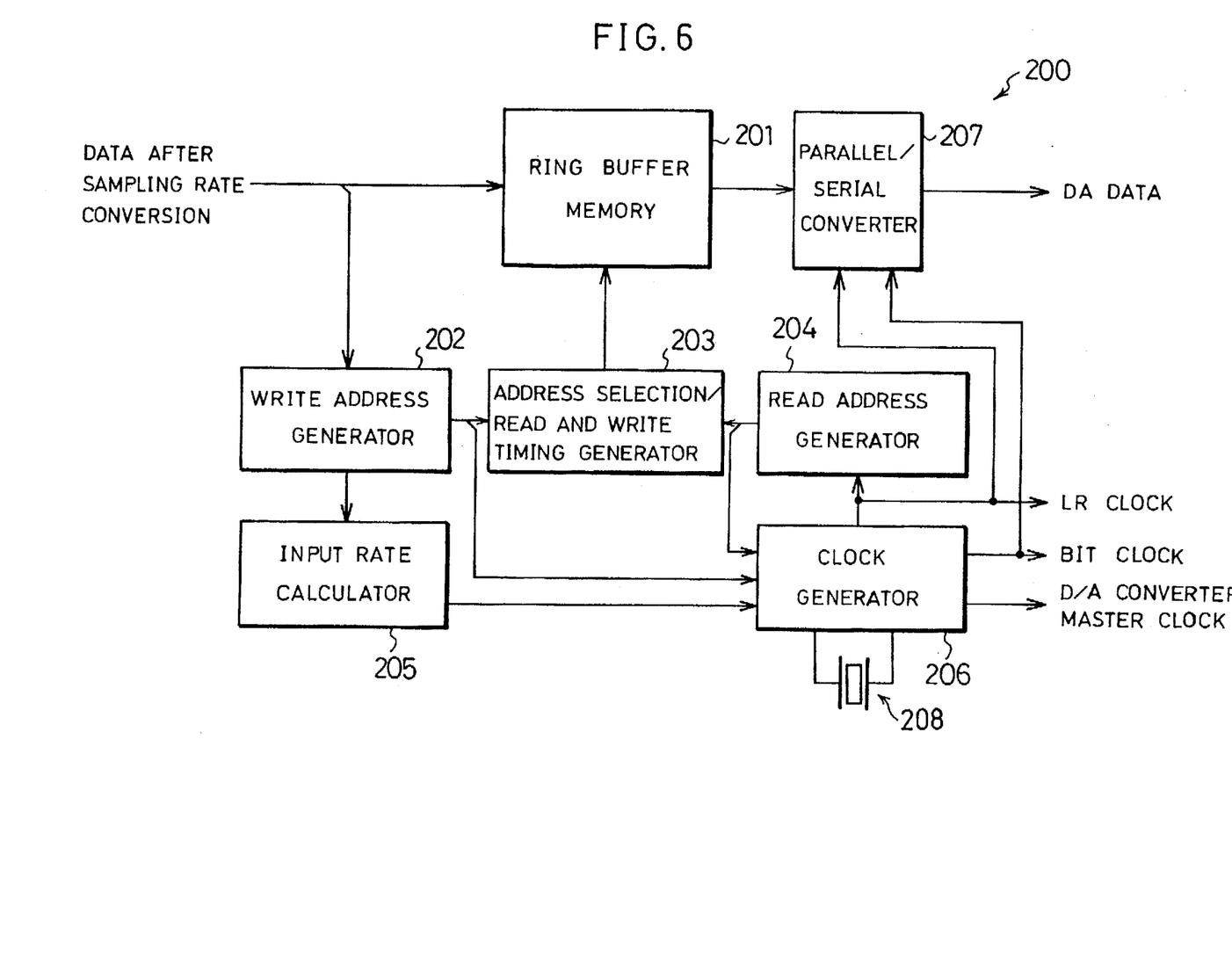
FIG. 6 is a block diagram showing the schematic structure of the digital data buffering device.

As illustrated in FIG. 6, a buffering device 200 of the present invention is applied to the output interface 8 shown in FIG. 1. In the buffering device 200, a ring buffer memory 201 (memory means) is provided. The ring buffer memory 201 temporarily stores data after the conversion of the sampling rate. Output data from the ring buffer memory 201 is input to a parallel/serial converter 207. The parallel/serial converter 207 outputs data (hereinafter just referred to as DA data) to be input to a D/A converter. The DA data is synchronous with an LR clock, a bit clock and a D/A converter master clock, generated by a clock generator 206.

Moreover, the buffering device 200 is provided with a write address generator 202 (first address generating means), and an address selection/read and write timing generator 203. The write address generator 202 may be formed as an address counter. Data to be stored in the ring buffer memory 201 is input to an area corresponding to an address signal generated by the write address generator 202. The address signal is supplied to the ring buffer memory 201 in synchronization with timing generated by the address selection/read and write timing generator 203.

An input rate calculator 205 (average rate calculating means), the clock generator 206 (transfer rate controlling means) and a read address generator 204 (second address generating means) are sequentially connected to the write address generator 202. The read address generator 204 may be formed as an address counter.

The read address generator 204 is a circuit for generating the address of output data according to clocks generated by the clock generator 206. The address is supplied to the ring buffer memory 201 in synchronization with the timing generated by the address selection/read and writhe timing generator 203.

The following description will explain in detail the input rate calculator 205.

Figure 9:
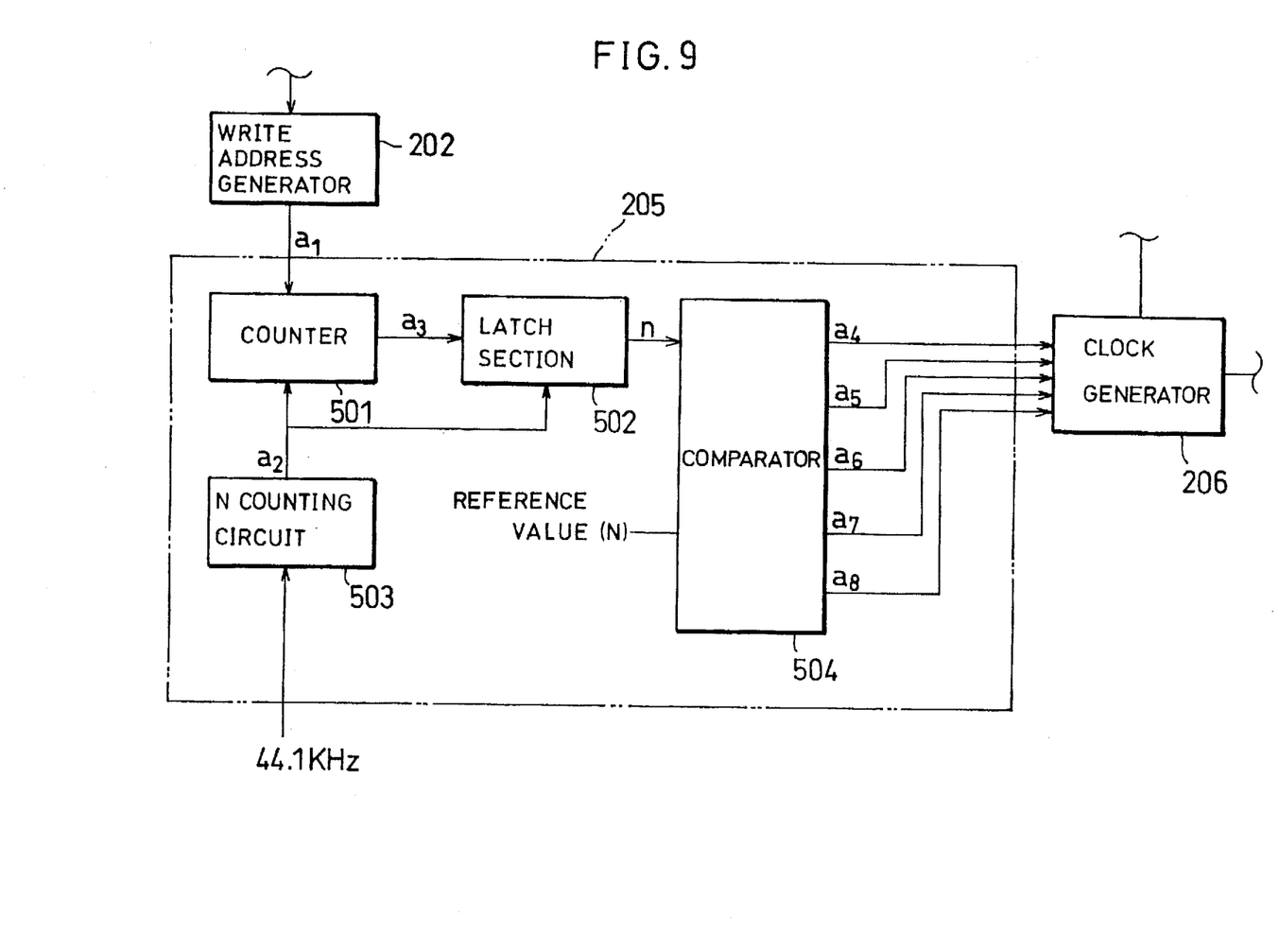
FIG. 9 is a block diagram showing the internal structure of an input rate calculator shown in FIG. 6.

FIG. 9 illustrates an example of the internal block structure of the input rate calculator 205. The input rate calculator 205 is formed by a counter 501, a latch section 502, an N counting circuit 503, and a comparator 504.

The counter 501 is connected to the write address generator 202, and counts the number of pulses of a pulse signal $a_1$ input from the write address generator 202. The pulse signal $a_1$ is generated by the write address generator 202 every time a piece of data after the conversion of the sampling rate is written in the ring buffer memory 201 (see FIG. 6). For example, an n-number values counted by the counter 501 (hereinafter referred to as the count n) is input to the latch section 502.

The latch section 502 latches the count n counted by the counter 501, and inputs to a comparator 504, to be described later, a count n counted just before the counter 501 is reset.

The N counting circuit 503 inputs a pulse signal $a_2$ to the counter 501 and the latch section 502. The count n of the counter 501 is reset by the pulse signal $a_2$. The pulse signal $a_2$ (an output of a $\frac{1}{3}$ divider 400 shown in FIG. 7) is generated every time N pulses of 44.1 kHz, which are generated by a pendulum 208 (see FIG. 6) of this system, are counted.

The comparator 504 compares the count n latched by the latch section 502 and the reference value "N" to determine the difference therebetween, and outputs the result to the clock generator 206 in a later stage.

With the structure of the input rate calculator 205, the average of input rates of data after the conversion of the sampling rate in a given period of time, and the difference between the average input rate and a reference output rate are calculated as follows.

First, the pulse signal $a_1$ is input to the counter 501 from the write address generator 202. The counter 501 counts the number of pulses of the pulse signal $a_1$, and inputs the count n to the latch section 502. At this time, if the count n of the counter 501 is reset by the pulse signal $a_2$ from the N counting circuit 503, the latch section 502 latches the count n counted just before the reset and inputs the count n to the comparator 504.

The count n represents a value corresponding to the average input rate in a given period (before the next pulse signal $a_2$ is input). The reference value N indicates a value corresponding to the reference output rate.

The comparator 504 compares the count n and the reference value N, and judges the difference therebetween by the following methods, ① to ⑤.

① When the relation between the count n and the reference value N is $n<(0.98 \times N)$, the count n is judged to be (−2%), i.e., 2% behind the reference value N.

② When the relation between the count n and the reference value N is $n<(0.99 \times N)$, the count n is judged to be (−1%), i.e., 1% behind the reference value N.

③ When the relation between the count n and the reference value N is $n=N$, it is judged that there is no difference between the count n and the reference value N (0%).

④ When the relation between the count n and the reference value N is $n>(1.01 \times N)$, the count n is judged to be (+1%), i.e., 1% ahead of the reference value N.

⑤ When the relation between the count n and the reference value N is $n>(1.02 \times N)$, the count n is judged to be (+2%), i.e., 2% ahead of the reference value N.

The results of the judgement are output as signals $a_4$ to $a_8$ from the comparator 504 to the clock generator 206 to be described later.

In this embodiment, the judgement is made using the five judging methods, ① to ⑤ (the difference between the count n and the reference value N is given as −2%, −1%, +1%, or +2%). However, it is also possible to judge the difference by ±P % (P is an arbitrary value).

Next, the structure of the clock generator 206 will be explained in detail below.

Figure 7:
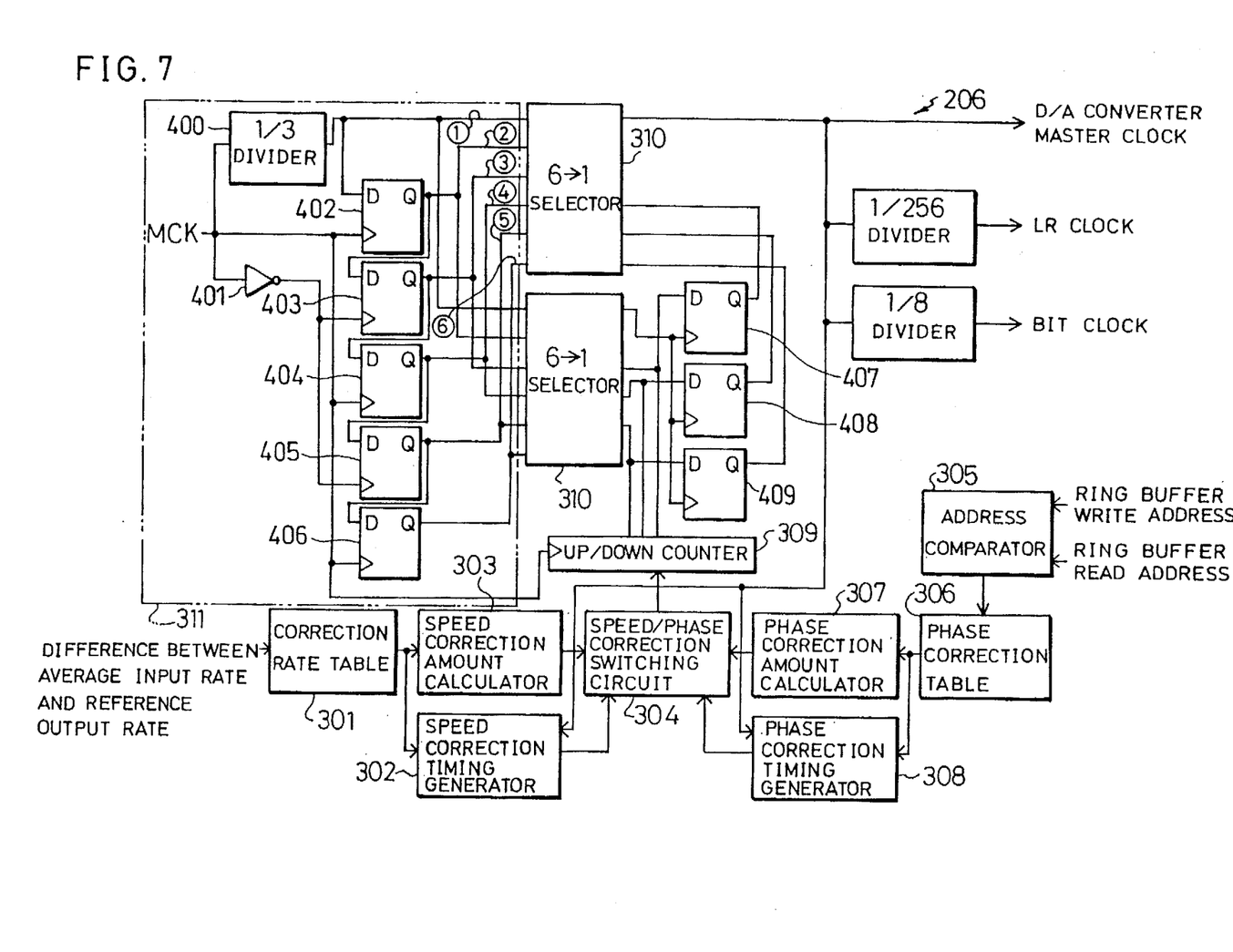
FIG. 7 is a block diagram showing the internal structure of a clock generator in the buffering device of FIG. 6.

FIG. 7 shows the block diagram of the clock generator 206. As illustrated in FIG. 7, the clock generator 206 is provided with a correction rate table 301. The correction rate table 301 stores a correction method as a table, for correcting the difference between the average input rate calculated by the input rate calculator 205 and the reference output rate. The content of the table is that a cyclic correction of $K_1/6$ (a phase correction of $k_1\pi/3$) is applied to the reference clock $m_1$ times every $M_1$ cycles so that, for example, when the average input rate is 2% ahead of the reference clock, the reference clock is shortened by $\frac{1}{6}$ cycle twice in 17 reference clock cycles (the phase of the reference clock is made advance by $\pi/3$).

By correcting the difference between the average input rate and the reference output rate according to the content of the correction rate table 301, the average input rate and the average output rate can be made equal to each other.

The correction rate table 301 is connected to a speed/phase correction switching circuit 304 (timing controlling means) through a speed correction amount calculator 303 and a speed correction timing generator 302. The speed correction amount calculator 303 matches the difference between the average input rate and the reference output rate, i.e., the speed correction amount, with the count of an UP/DOWN counter 309 to be described later. The speed correction timing generator 302 generates the timing for the speed correction. Consequently, the speed correction amount is input to the speed/phase correction switching circuit 304 according to the timing generated by the speed correction timing generator 302.

In addition, the clock generator 206 is provided with an address comparator 305 (address comparing means) and a phase correction table 306. The address comparator 305 is connected to the write address generator 202 and the read address generator 204 (see FIG. 6), and a write address and a read address are input to the address comparator 305. With this structure, in the address comparator 305, a phase difference between the read address and the write address is calculated, and the phase difference is input to the phase correction table 306. A correction method for correcting the phase difference is stored as a table in the phase correction table 306. As to the content of the table, the reference clock is corrected by $K_2/6$ cycle $m_2$ times in every $M_2$ cycles like the correction method of the input rate.

The phase correction table 306 is connected to the speed/phase correction switching circuit 304 through a phase correction amount calculator 307 and a phase correction timing generator 308. The phase correction amount calculator 307 matches the phase difference between the read address and the write address calculated by the address comparator 305, i.e., the phase correction amount, with the count of the UP/DOWN counter 309 to be described later. The phase correction timing generator 308 generates the timing for the phase correction. Consequently, the phase correction amount is input to the speed/phase correction switching circuit 304 according to the timing generated by the phase correction timing generator 308.

Figure 10:
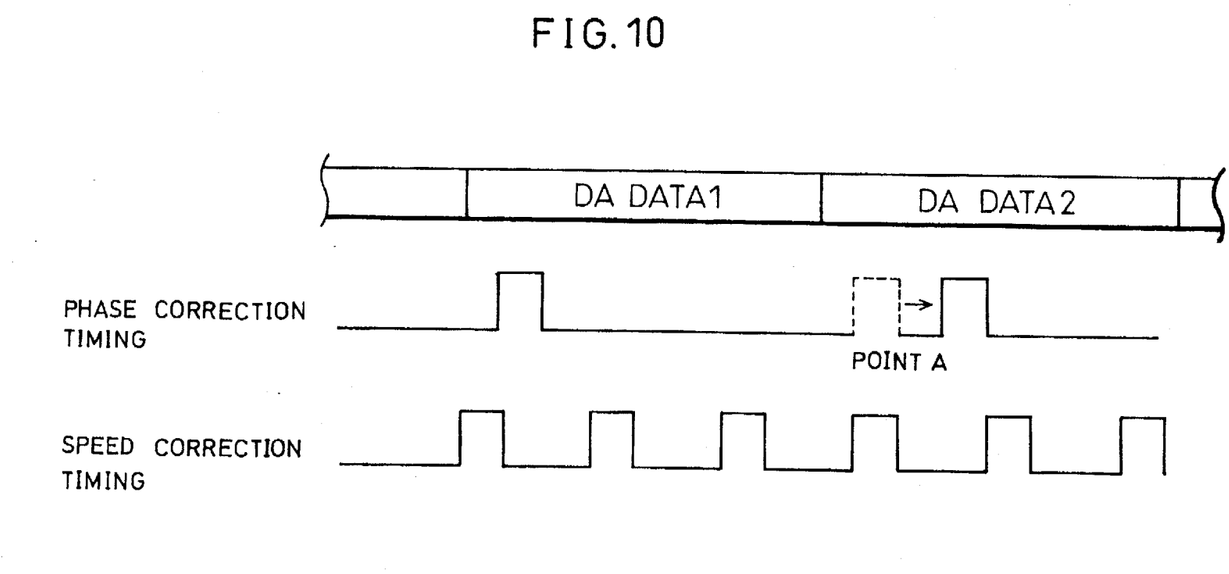
FIG. 10 is an explanatory view showing the relation between the timing of a phase correction and the timing of a speed correction.

The speed correction amount and the phase correction amount are input to the speed/phase correction switching circuit 304 from the speed correction timing generator 302 and the phase correction timing generator 308, respectively, for example, by the timing shown in FIG. 10. In this case, if the timing for the speed correction and the timing for the phase correction are generated at the same time, the speed/phase correction switching circuit 304 controls the timing so that one correction takes priority over the other.

For instance, at the point "A" in FIG. 10, the timing for the speed correction and the timing for the phase correction are generated at the same time. In this case, the timing for the phase correction is delayed under the control of the speed/phase correction switching circuit 304. The phase correction is performed every time an address is read from the ring buffer memory, while the speed correction is carried out in asynchronous with the phase correction.

In the clock generator 206, the UP/DOWN counter 309 and 6→1 selectors 310 (reference clock selecting means) are provided. A counted value corresponding to the speed correction amount is input through the speed/phase correction switching circuit 304 to the UP/DOWN counter 309 according to the timing for the speed correction. Similarly, a counted value corresponding to the phase correction amount is also input through the speed/phase correction switching circuit 304 to the UP/DOWN counter 309 according to the timing for the phase correction. Thus, the UP/DOWN counter 309 is allowed to specify reference clocks to be selected by the 6→1 selectors 310.

One of the 6→1 selectors 310 (hereinafter referred to as the first 6→1 selector 310) is directly connected to the UP/DOWN counter 309, while the other 6→1 selector 310 (hereinafter referred to as the second 6→1 selector 310) is connected to the UP/DOWN counter 309 through flip-flops 407, 408, and 409. In this configuration, the reference clock is selected as follows.

The first 6→1 selector 310 selects one reference clock from a plurality of reference clocks generated by a delay clock generating sections, to be described later, according to the count of the UP/DOWN counter 309. The selected reference clock is input to the clock terminals of the flip-flops 407, 408, and 409. When the reference clock becomes high level, the count of the UP/DOWN counter 309 is set in the flip-flops 407, 408, and 409. The second 6→1 selector 310 selects one reference clock according to signals from the flip-flops 407, 408, and 409. Thus, the 6→1 selectors 310 are capable of changing the phase of the reference clocks while selecting one reference clock from a plurality of reference clocks generated by the delay clock generating section, to be described later, according to an increase or a decrease in the count of the UP/DOWN counter 309.

A delay clock generating section 311 (delay clock generating means) for generating clocks having the same frequency and different phases, is connected to the UP/DOWN counter 309 and the 6→1 selectors 310.

The delay clock generating section 311 is formed by a ⅓ divider 200 (divider means), an inverter 401, and flip-flops 402 to 406 (delay means). As a result, six types of reference clocks (clocks ① to ⑥) are generated as follows.

The clock ① is a clock produced by dividing a master clock (MCK) by three with the ⅓ divider 400. The master clock is generated by an internal or external quartz oscillator.

The clock ② is a clock output from the flip-flop 402. The clock ① and the master clock are input to the flip-flop 402. Consequently, the clock ② becomes a clock whose frequency is equal to that of the clock ① and whose phase lags by ⅙ cycle behind the clock ①.

The clock ③ is a clock output from the flip-flop 403. The clock ② is input to the flip-flop 403. The master clock is also input to the flip-flop 403 through the inverter 401. Consequently, the clock ③ becomes a clock whose frequency is equal to that of the clock ② and whose phase lags by ⅙ cycle behind the clock ②.

The clock ④ is a clock output from the flip-flop 404. The clock ③ and the master clock are input to the flip-flop 404. Thus, the clock ④ becomes a clock whose frequency is equal to that of the clock ③ and whose phase lags by ⅙ cycle behind the clock ③.

The clock ⑤ is a clock output from the flip-flop 405. The clock ④ is input to the flip-flop 405. The master clock is also input to the flip-flop 405 through the inverter 401. Thus, the clock ⑤ is a clock whose frequency is equal to that of the clock ④ and whose phase lags by ⅙ cycle behind the clock ④.

The clock ⑥ is a clock output from the flip-flop 406. The clock ⑤ and the master clock are input to the flip-flop 406. Consequently, the clock ⑥ becomes a clock whose frequency is equal to that of the clock ⑤ and whose phase lags by ⅙ cycle behind the clock ⑤.

Namely, the clocks ① to ⑥ have the same frequency, and the phases thereof are shifted by ⅙ cycle with respect to each other.

In the configuration of the delay clock generating section 311, since all of the reference clocks having the same frequency and different phases are generated in the delay clock generating section 311, it is not necessary to provide a mechanism for generating the reference clocks independently of each other, thereby simplifying the structure. This configuration also achieves easy generation of reference clocks based on a master clock.

The following description will discuss the operation of the digital data buffering device of this embodiment.

As illustrated in FIG. 6, data produced after the sampling rate conversion is input to the ring buffer memory 201 at the time the operation is completed by the above-mentioned method.

At this time, address signals generated by the write address generator 202 and the read address generator 204 are supplied to the ring buffer memory 201 by the address selection/read and write timing generator 203. In addition, the address selection/read and write timing generator 203 generates timing for inputting and outputting the address signals to the ring buffer memory 201.

Figure 11:
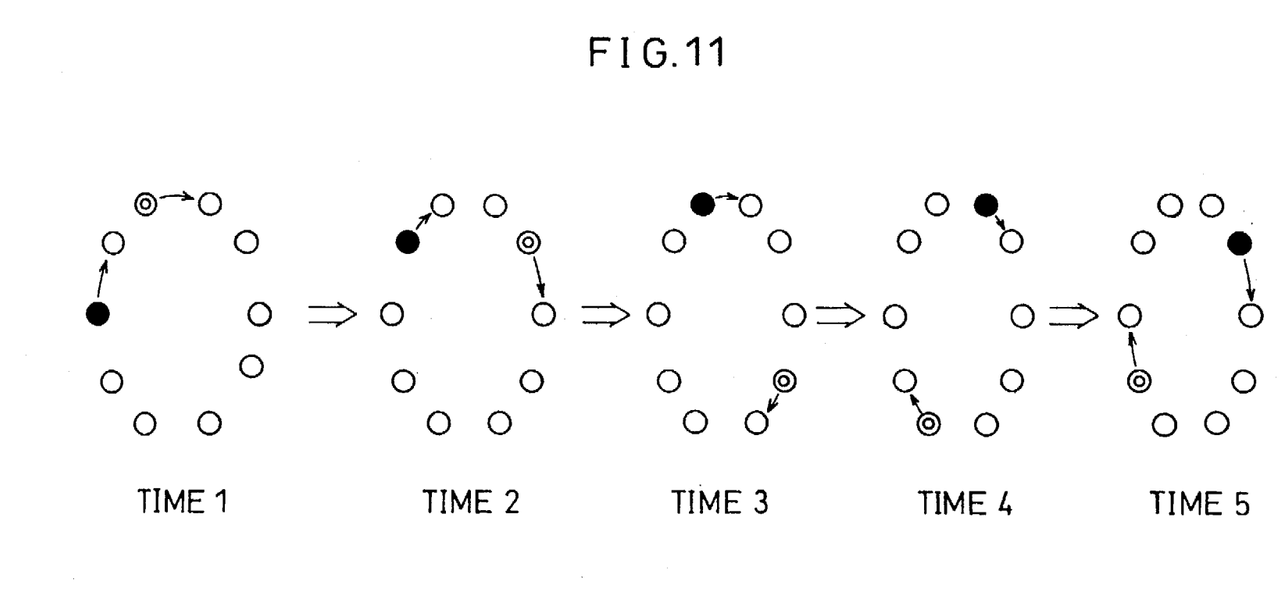
FIG. 11 is an explanatory view showing the state in which a read address and a write address rotate on a ring buffer memory.

Under the phase-correction control, for example, as shown in FIG. 11, the input address and the output address are controlled on a ring memory of the ring buffer memory 201 by the clock generator 206 so that the positions of the input address and the output address are most separated from each other.

In FIG. 11, "○", "●", and "⊙" indicate the address of the ring buffer memory 201, the write address, and the read address, respectively. At time 1, the read address and the write address are very close to each other. Therefore, the clock generator 206 (see FIG. 6) advances a read clock used for reading the read address (at time 2 and time 3) so that the positions of the read address and the write address are most separated from each other (at time 4 and time 5). However, usually, such control cannot be performed by a single operation. For instance, in order to bring the positional relation shown at time 1 into the positional relation shown at time 2, the clock generator 206 performs control so that the read address and the write address are moved as much as possible on the ring memory of the ring buffer memory 201.

With this control, for example, if the address circulates in the order of 0, 1, 2, . . . , 9, 0, 1, . . . , the right address and the read address are positioned so that the difference therebetween becomes five. For example, the read address becomes five when the write address is zero, and the read address becomes six when the write address is one.

In general, when there are n addresses and when the address circulates in the order of 0, 1, . . . , n–1, 0, 1, the positions of the input address and the output address are most separated from each other by controlling the difference between the write address and the read address to be n/2.

In this case, it is possible to control the difference between the write address and the read address to fall within a range of (n/2)±α (α is an arbitrary value) according to the memory capacity of the ring buffer memory 201.

The control of the address is no more than control which is always performed for storing buffer data in an area which is substantially a half of the capacity of the ring buffer memory 201. As described above, if control is performed based on the difference between the write address and the read address, the management of the number of data stored in the ring buffer memory 201 can be easily carried out.

Moreover, as described above, if the transfer rate of the output data is controlled so that the number of data stored in the ring buffer memory 201 is always within a predetermined range, the following effect is produced. Namely, it is possible to always ensure a writable area and a readable area which are substantially equal to each other. It is thus possible to sufficiently correspond to a change in the input rate, and eliminate such problems that writing of data is infeasible due to saturation of the ring buffer memory 201 with data and that reading of data is unavailable because the memory is emptied.

Furthermore, as described above, the input rate calculator 205 calculates the average input rate of data produced after the conversion of the sampling rate in a given period of time. Consequently, the difference between the average input rate of the signal D1 shown in FIG. 1 and the reference output rate is obtained. The difference calculated by the input rate calculator 205 is then supplied to the clock generator 206.

In the clock generator 206, the reference clock is adjusted based on a difference between the average input rate and the reference output rate (standard speed) in a predetermined period of time so as to arrange the average input rate and the average output rate to be equal.

With this arrangement, even if the transfer rate of the input data fluctuates because of a deviation of the cycle of a transfer clock used for transferring the input data from a predetermined reference value or other reasons, it is possible to prevent a fluctuation of the D/A converter master clock.

Thus, as shown in FIG. 7, in the clock generator 206, the difference between the average input rate and the reference output rate (standard speed) is input into the correction rate table 301. Then, the correction rate table 301 refers to the table contents and supplies data that is used for generating the timing for a correction to be applied to the transfer clock and that indicates the amount of the correction, to the speed correction timing generator 302 and the speed correction amount calculator 303. The speed correction timing generator 302 and the speed correction amount calculator 303 generate the timing for the speed correction and the amount of the speed correction, respectively.

Meanwhile, the input and output addresses of the ring buffer memory 201 output by the write address generator 202 and the read address generator 204 are input to the address comparator 305. The address comparator 305 compares these addresses and inputs the difference of the addresses into the phase correction table 306. The phase correction table 306 refers to the table contents and supplies data, which is used for generating the timing for a phase correction and indicates the amount of the phase correction, to the phase correction timing generator 308 and the phase correction amount calculator 307 based on the difference of the addresses. Then, the phase correction timing generator 308 and the phase correction amount calculator 307 give the timing for the phase correction and the amount of the phase-correction, respectively.

Consequently, the number of times the reference clock is to be corrected in given cycles and the amount of correction to be made to the cycle of the reference clock are determined. For instance, if the input rate is 1% higher than the standard speed, one cycle of the reference clock is shortened by ⅙ cycle about every 17 cycles.

When requests for the speed correction and the phase correction are given at the same time, the speed/phase correction switching circuit 304 performs control so that one of the requests takes priority over the other.

At this time, the delay clock generating section 311 in the clock generator 206 generates six types of reference clocks ① to ⑥ shown in FIG. 7, and adjusts the reference clocks as mentioned above. The six types of the reference clocks are obtained by dividing a master clock generated by the pendulum 208 (see FIG. 6) by three. The reference clocks have the same frequency. The phases of the six types of the reference clocks are shifted from each other by ⅓ cycle of the master clock, i.e., ⅙ cycle of the reference clocks.

The speed/phase correction switching circuit 304 controls the UP/DOWN counter 309 according to the above-determined amounts of speed correction and phase correction so that the average transfer rate of the input and the average transfer rate of the output become equal to each other and that the difference between the write address and the read address falls within a predetermined range. Then, the 6→1 selectors 310 select one of the reference clocks according to the count of the UP/DOWN counter 309. The selected reference clock becomes a master clock of the D/A converter. A clock produced by dividing the reference clock by 256 becomes an LR clock. A clock produced by dividing the reference clock by 8 becomes a bit clock. These clocks are used for a transfer of audio data to the D/A converter.

Figure 8:
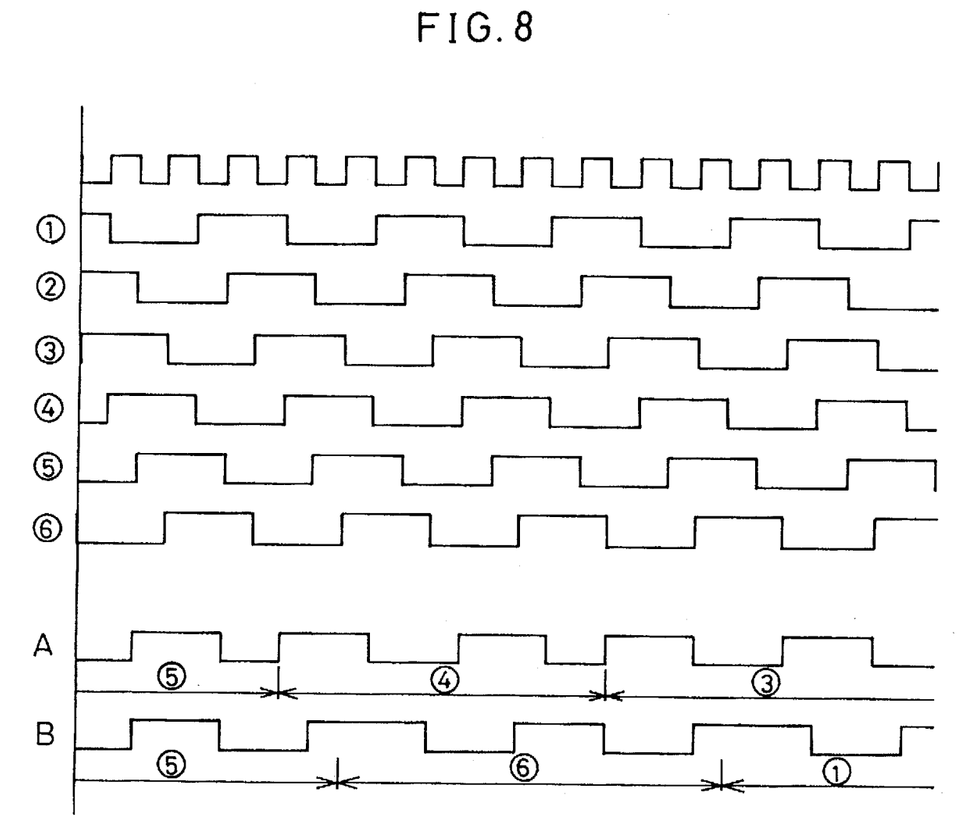
FIG. 8 is an explanatory view showing clocks generated by the clock generator of FIG. 7.

FIG. 8 shows six types of clocks ① to ⑥ shown in FIG. 7, and the master clock of the D/A converter generated by changing selections. In FIG. 8, "A" indicates that clocks ⑤, ④ and ③ are selected in this order, and "B" indicates that clocks ⑤, ⑥ and ① are selected in this order.

The application of the digital data buffering device of the present invention in not limited only to the sampling rate converter. Namely, the digital data buffering device of the present invention is applicable to circuits in which jitter of clocks causes problems, for example, to a digital audio interface using a digital PLL (phase-locked loop), and the same effect can be obtained in such an application.

As described above, the digital data buffering device of the present invention includes: a buffer memory in which input data is temporarily stored; a write address counter for reading the address of data at the time the data is stored; a read address counter for reading the address of data at the time the data is read; and a transfer rate controlling section for determining the cycle of transfer clock for reading and outputting the data from the buffer memory so that the difference between the count of the write address counter and the count of the read address counter is always within a predetermined range.

In this configuration, when input data is successively stored in the buffer memory, the read and write address counters read the address of data being stored and the address of data being read, respectively.

Subsequently, the transfer rate controlling section determines the cycle of the transfer clock used for reading and outputting the data from the buffer memory so that the difference between the count of the write address counter and the count of the read address counter always falls within a predetermined range. Thereafter, the stored data is output according to the transfer clock determined by the transfer rate controlling section.

Therefore, even when the average input rate deviates from a predetermined reference value, the buffer memory can never be saturated or emptied. Moreover, if the average input rate deviates from the predetermined reference value when monitoring the input signal of the digital data interface through the D/A converter, it is possible to prevent a fluctuation of the transfer rate of digital data to the D/A converter. It is thus possible to prevent deterioration of the quality of output signals of digital data. In addition, the use of a synchronous sampling rate converter allows the reproduction of output signals.

Furthermore, the digital data buffering device includes a delay clock generating section for generating a plurality of reference clocks which have the same frequency and different phases according to a change in the transfer rate of the input data so as to output data, and the transfer rate controlling section decides one of the deference clock generated by the delay clock generating section as a transfer clock for outputting the data.

In this configuration, when determining a transfer clock of the output data by the transfer rate controlling section, the delay clock generating section generates a plurality of clocks which have the same frequency and different phases according to a change in the transfer rate of the input data as a reference clock for outputting the data.

Therefore, compared to a mechanism for generating clocks, which have the same frequency and different phases, independently of each other, the structure of the device can be simplified. Additionally, the above-mentioned configuration eases the generation of a transfer clock used for outputting data.

The digital data buffering device further includes an input rate calculating section for periodically calculating the average transfer rate of the input data, and the transfer rate controlling section increases or decreases the transfer rate of the output data so that the average transfer rate of the output data becomes equal to the average transfer rate of the input data calculated by the input rate calculating section.

Therefore, when monitoring the input signal of the digital data interface through the D/A converter, even if the average input rate deviates from the predetermined reference value, it is possible to prevent a fluctuation of the transfer rate of digital data to the D/A converter. It is thus possible to prevent deterioration of the quality of output signals of the digital data. Furthermore, if a synchronous sampling rate converter is used, the reproduction of output signals becomes available.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A digital data buffering device, for temporarily storing input data whose transfer rate varies and outputting the input data at an average transfer rate, comprising:
   a memory for storing input data;
   a transfer rate controller for controlling a transfer rate of output data to be transferred from said memory,
   a first address generator for generating a write address of input data to be stored in said memory;
   a second address generator for generating a read address of output data to be transferred from said memory;
   wherein said transfer rate controller includes a first output rate adjuster for adjusting the transfer rate of the output data based on a different between the write address generated by said first address generator and the read address generated by said second address generator so that the number of data stored in said memory is always within a predetermined range.

2. The digital data buffering device according to claim 1, wherein said memory is a ring buffer memory.

3. The digital data buffering device according to claim 1, wherein said first output rate adjuster adjusts the transfer rate of the output data so that the difference between the write address generated by said first address generator and the read address generated by said second address generator becomes about a half of a total number of addresses.

4. The digital data buffering device according to claim 1, wherein said first address generator is an address counter.

5. The digital data buffering device according to claim 1, wherein said second address generator is an address counter.

6. The digital data buffering device according to claim 1, further comprising average rate calculator for calculating an average input rate every predetermined period of time based on signals from said first address generator,
   wherein said transfer rate controller includes a second output rate adjuster for adjusting the transfer rate of output data so that an average input rate calculated every predetermined period of time by said average rate calculator and an average output rate become equal to each other.

7. The digital data buffering device according to claim 1, wherein said transfer rate controller including a timing controller for controlling timing so that, when timing for a transfer rate adjustment to be performed by said first output rate adjuster and timing for a transfer rate adjustment to be performed by said second output rate adjuster coincide with each other, one of the adjustments is started after the other adjustment is completed.

8. The digital data buffering device according to claim 1, wherein said first output rate adjuster includes:
   a reference clock generator for generating a plurality of reference clocks having an equal frequency and different phases; and
   a reference clock selector for selecting one of the reference clocks generated by said reference clock generator; and
   wherein said first output rate adjuster determines the reference clock selected by said reference clock selector as a transfer clock which is used for outputting data.

9. The digital data buffering device according to claim 8, wherein said reference clock selector includes:
   an address comparator for finding a difference between the write address generated by said first address generator and the read address generated by said second address generator; and
   a correction table for indicating contents of a correction to be applied to the reference clocks according to the difference between the write address and the read address, and
   wherein said reference clock selector selects a reference clock based on the correction table.

10. The digital data buffering device according to claim 8, wherein said reference clock generator includes:
- a master clock generator for generating one master clock;
- a divider for dividing the master clock; and
- a delay means for delaying phase of clocks generated by said divider by a predetermined amount with respect to each other.

11. A digital data buffering device for temporarily storing input data whose transfer rate varies and outputting the input data at an average transfer rate, comprising:

memory means for storing input data;

transfer rate controlling means for controlling a transfer rate of output data to be transferred from said memory means; and average rate calculating means for calculating an average input rate every predetermined period of time, wherein said transfer rate controlling means controls the transfer rate of output data so that the average input rate calculated every predetermined period of time by said average rate calculating means and an average output rate become equal to each other.

12. The digital data buffering device according to claim 11, wherein said transfer rate controlling means includes:
- reference clock generating means for generating a plurality of reference clocks having an equal frequency and different phases; and
- reference clock selecting means for selecting one of the reference clocks generated by said reference clock generating means, and wherein said transfer rate controlling means determines the reference clock selected by said reference clock selecting means as a transfer clock which is used for outputting data.

13. The digital data buffering device according to claim 12, wherein said reference clock selecting means includes:
- difference calculating means for finding a difference between an average input rate in the predetermined period of time and a reference value of the output rate; and
- a correction table for indicating contents of a correction to be applied to the reference clocks according to the difference, and wherein said reference clock selecting means selects a reference clock based on the correction table.

14. The digital data buffering device according to claim 13, wherein said reference clock generating means includes:
- master clock generating means for generating one master clock;
- divider means for dividing the master clock; and
- delay means for delaying phases of clocks generated by said divider means by a predetermined amount with respect to each other.

* * * * *